United States Patent
DeSane (10) Patent No.: US 7,213,001 B2
(45) Date of Patent: May 1, 2007

(54) BUSINESS METHOD FOR ACQUISITION OF DEBTOR REAL-ESTATE AND RESTRUCTURING OF DEBT

(75) Inventor: Bill DeSane, New York, NY (US)

(73) Assignee: Carpe Diem Worldwide Enterprises, Inc., New York, NY (US)

( * ) Notice: Subject to any disclaimer, the term of this patent is extended or adjusted under 35 U.S.C. 154(b) by 924 days.

(21) Appl. No.: 09/882,992

(22) Filed: Jun. 14, 2001

(65) Prior Publication Data

US 2003/0041018 A1 Feb. 27, 2003

(51) Int. Cl.
  *G06Q 40/00* (2006.01)
(52) U.S. Cl. .............................. 705/37; 705/35; 705/38
(58) Field of Classification Search ................. 705/37, 705/38, 35
  See application file for complete search history.

(56) References Cited

U.S. PATENT DOCUMENTS

| | | | |
|---|---|---|---|
| 5,644,726 A | 7/1997 | Oppenheimer | 395/238 |
| 5,689,650 A | 11/1997 | McClelland et al. | 395/236 |
| 5,875,437 A * | 2/1999 | Atkins | 705/40 |
| 5,983,206 A * | 11/1999 | Oppenheimer | 705/38 |
| 6,233,566 B1 * | 5/2001 | Levine et al. | 705/37 |
| 6,249,775 B1 * | 6/2001 | Freeman et al. | 705/36 |
| 6,460,021 B1 * | 10/2002 | Kirksey | 705/35 |

OTHER PUBLICATIONS

Kathleen Sindell. The Handbook of Real Estate Lending. 1996. Irwin Professional Publishing. pp. 408-421.*
Garth Marston and Hugh Kelleher. Creative Real Estate Financing. 1983, John Wiley. pp. 104-107.*
Barchard et al., "Lenders aim to halve home repossessions" Financial Times, p. 8 Dec. 20, 1991.*

* cited by examiner

Primary Examiner—Jagdish N Patel
(74) Attorney, Agent, or Firm—Wolf Block Schorr & Solis-Cohen LLP (57) ABSTRACT

A method for restructuring the debt of a debtor who has an interest in a distressed property by a third party including the steps of comparing a present appraised value of the property to a total cost for purchasing the property from the debtor by the third party, satisfying the personal debt of debtor by the third party, and reselling the property back from the third party to the debtor based upon a present appraised value of the property, and if the present appraised value of the property exceeds the total cost to the third party by a preselected value then the third party purchases the property from the debtor, satisfies the personal debt of the debtor and resells the property back to the debtor at the present value of the property.

8 Claims, 5 Drawing Sheets

BUSINESS METHOD FOR ACQUISITION OF DEBTOR REAL-ESTATE AND RESTRUCTURING OF DEBT

FIELD OF THE INVENTION

The present invention relates generally to a method for assisting a debtor who has an interest in a distressed property and more particularly to a method for assisting said debtor including the steps of purchasing said distressed property by a third party with the satisfaction of said debtor's debts by said third party and the resale of said property from the third party back to the debtor at a premium.

BACKGROUND OF THE INVENTION

The vast majority of homes purchased are purchased on a the basis of loan instrument which includes a promissory note that specifies a principal amount borrowed from a lender and an interest rate, and is secured by a mortgage or deed of trust on the property. The promissory note establishes the borrower's obligation to make periodic payments to the lender and the mortgage or deed of trust establishes a the lender's right to foreclose on the property in the event the borrower fails to make the scheduled period payments.

Under most circumstances the borrower completes the loan obligation by making a lump sum payment before the end of the period to satisfy the loan. However not all borrowers can consistently make loan payments. Often times an acute event or circumstance may cause the borrower to stop making payments. For example, unexpected medical bills, a layoff from a job, a sudden downturn in business, or any other number of other unforeseen financial hardships may cause the borrower to suddenly stop making payments and default on the loan.

As a result of the borrower's default the lender may foreclose on the property. Foreclosure is a legal process by which the lender will ultimately obtain title in property and resell the property. From the borrower's perspective foreclosure is traumatic both from a financial as well as emotional standpoint. From a financial standpoint, the borrower not only loses the equity which has been established in the property but even after the property has been foreclosed continues to suffer in the sense that the borrower's credit has been irrevocably damaged. This damage to the borrower's credit may ultimately prevent the borrower from purchasing a subsequent home. From an emotional standpoint the borrower suffers from the loss of a home. This loss may further exacerbate the difficulties (e.g. sickness, loss of job) that caused the financial difficulties to begin with.

From the lender's perspective foreclosure is also undesirable. The foreclosure process is costly and thus further increases the lender's interest in an already distressed property. In addition unless the ultimate sale price of the home after foreclosure is substantially higher than the original value of the home the lender's return may be compromised.

Prior to foreclosure or subsequent thereto the borrower may file for bankruptcy. Ultimately however the result is the same, i.e. the bank will foreclose on the property once the payment schedule has not been met. Accordingly foreclosure and its resultant hardships discussed above are not avoided by the borrower filing for bankruptcy. Moreover, by filing for bankruptcy, the borrower's credit will likely be damaged to point where obtaining any future loan will be extremely difficult thereby preventing the homeowner from purchasing a future home.

From the lender's perspective bankruptcy is also not a desirable alternative since the lender may be forced to "get in line" with other creditors and may only be able to obtain only a fraction of the loan amount. Further, bankruptcy is a rather complicated legal proceeding and thus has associated legal fees and costs.

In view of the above it is desirable to seek techniques which would enable the borrower to satisfy his loan obligations, as well as his other financial obligations, and at the same time maintain residence in his home while meeting such obligations. Similarly it is desirable to seek techniques which would ensure payment of the loan to the creditor in full without the need to rely upon either foreclosure and/or bankruptcy proceedings.

OBJECTS AND SUMMARY OF THE INVENTION

It is therefore an object of the present invention to provide a new and improved method for assisting a debtor with his financial obligations in which method a distressed property is purchased by a third party from the debtor, the debtor's existing debts are satisfied by said third party and the property is sold from the third party back to the debtor at a premium whereby the debtor is able to retain said property while still satisfying his existing debts.

It is another object of the present invention to provide a method for assisting a debtor in which the debtor's financial obligations are restructured in a manner which enables the debtor repay said debts to said third party without any significant harm to the debtor's credit.

It is still another object of the present invention to provide a method for restructuring the debt of a debtor by which method the debtor is able to maintain residence at the distressed residential property throughout the restructuring procedure.

These and other objects of the present invention which will become apparent from the following description of the method for acquisition of debtor real-estate and restructuring of debt.

The method of the present invention includes the steps of (1) itemizing and totaling all of the debtor's personal debt, i.e. calculating the debtor's balance of personal debt (hereinafter referred to as "B"); (2) determining the mortgage debt remaining on the residential property (hereinafter referred to as "M"); (3) determining the real property's present value, i.e. determining the appraised value of the home (hereinafter referred to as "A"); (4) calculating the closing costs for purchasing the home from the debtor based upon the remaining mortgage balance (hereinafter referred to as "$C_1$"); (5) determining the closing costs for reselling the real property back to the debtor based upon present value of the home (hereinafter referred to as "$C_2$"); (6) calculating a down payment for reselling the real property back to the debtor at the appraised value of the home (hereinafter referred to as "D"); (7) calculating the total costs (hereinafter referred to as "$T_C$") for purchasing the home from the debtor, satisfying the debtor's personal debt and reselling the home back to the debtor at the present appraised value of the home according the formula $T_C = (B + M + C_1 + C_2 + D)$ (Equation 1); (8) comparing the total costs $T_C$ to the present appraised value of the home "A" and if the appraised value of the home exceeds the total costs $T_C$ by a selected predetermined amount than the real property is purchased by a third party; the debtor's existing debt is satisfied by said third party; and the real property is immediately sold back to the debtor by said third party at a premium According to another aspect of the present invention if the present appraised value of the home A fails to exceed the total costs $T_C$ by said selected predetermined amount than the third party may purchase the distressed residential property and simultaneous enter into a lease agreement with the debtor whereby the debtor will rent the property from the third party for a selected time period. During the rental period the debtor continues to reduce his balance of personal debt until the debtor has eliminated or substantially eliminated his personal debt. Once the debtor's debt is eliminated the residential property is then sold back to the debtor at a premium.

It is to be understood that both the foregoing general description and the following detailed description are exemplary and not intended to be limit the scope of the claimed invention.

BRIEF DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE INVENTION

Referring now to the drawings wherein like reference characters designate identical or corresponding features or steps throughout the several views the present invention will be described.

As discussed above in the "Background of the Invention" the vast majority homes are purchased on the basis of a loan instrument which includes a promissory note that specifies a principal amount borrowed from a lender and an interest rate, and is secured by a mortgage or deed of trust on the property. The promissory note establishes the borrower's obligation to make periodic payments to the lender and the mortgage or deed of trust establishes a the lender's right to foreclose on the property in the event the borrower fails to make the scheduled period payments.

Often a "crisis" of some type alters the homeowner's financial situation and diminishes the homeowner's ability to meet his financial obligations and more particularly renders the homeowner unable to make the scheduled periodic payments according to the promissory note and mortgage agreements. Common "crisis" situations may include loss of job; illness and/or divorce. As a result of these "crisis" situations the homeowner's financial situation is altered to such an extent so that the homeowner is no longer able to meet the scheduled periodic payments on the residential property.

Under normal circumstances the homeowner's failure to meet the scheduled period payments on the residential property would result in foreclosure and/or bankruptcy. However, in accordance with the present invention a "third party", typically a for-profit corporation, assists the homeowner by purchasing the distressed residential property, satisfying the homeowner's outstanding debt and reselling the property back to the homeowner at a premium. The term "third party" as used herein merely indicates that the corporation or other organization employing the method of the invention is a third party relative to the debtor and the lending institution.

Specifically, as outlined in FIGS. 1–2, the third party applies an equation (Equation 1), discussed in more detail below, which compares the extent of the homeowner's debt to the present value of the home. If Equation 1 is satisfied the third party immediately purchases the distressed property, satisfies the homeowner's outstanding debt and immediately resells the property back to the homeowner at a premium. If Equation 1 is not satisfied then a second equation (Equation 2) is applied to determine how long it will take for the debtor to eliminate his outstanding personal debt. Based upon the result of the Equation 2 the third party purchases the property and either enters into (i) a short-term release with repurchase agreement with the homeowner or (ii) a long-term release with repurchase agreement with the homeowner. The specific details of these agreements are discussed in detail below. However, in either case, as shown, the application of the method according to the present invention ultimately results in the homeowner repurchasing the property.

Figure 1:
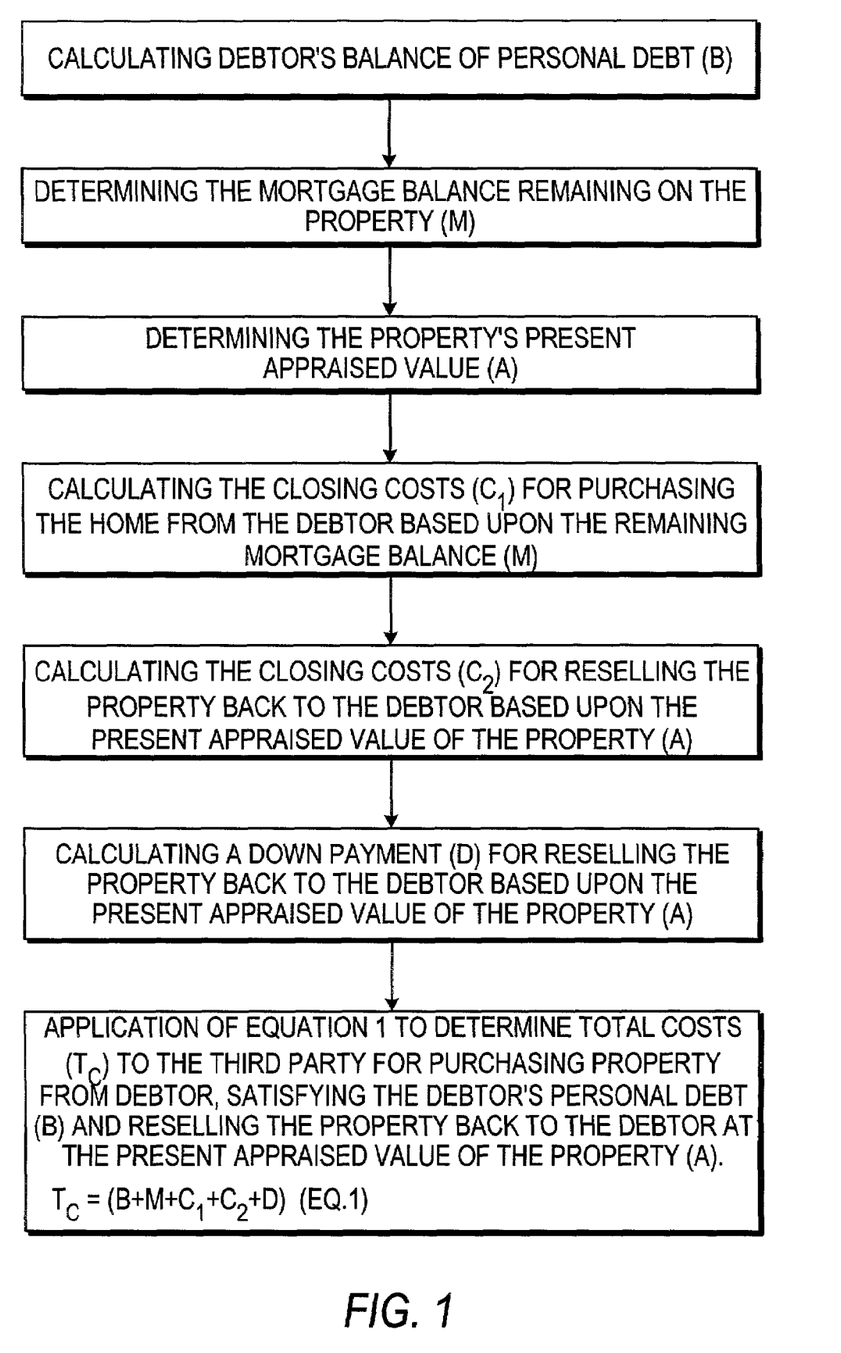
FIGS. 1–2 is a flow chart outlining the steps of the method according present invention.
Figure 2:
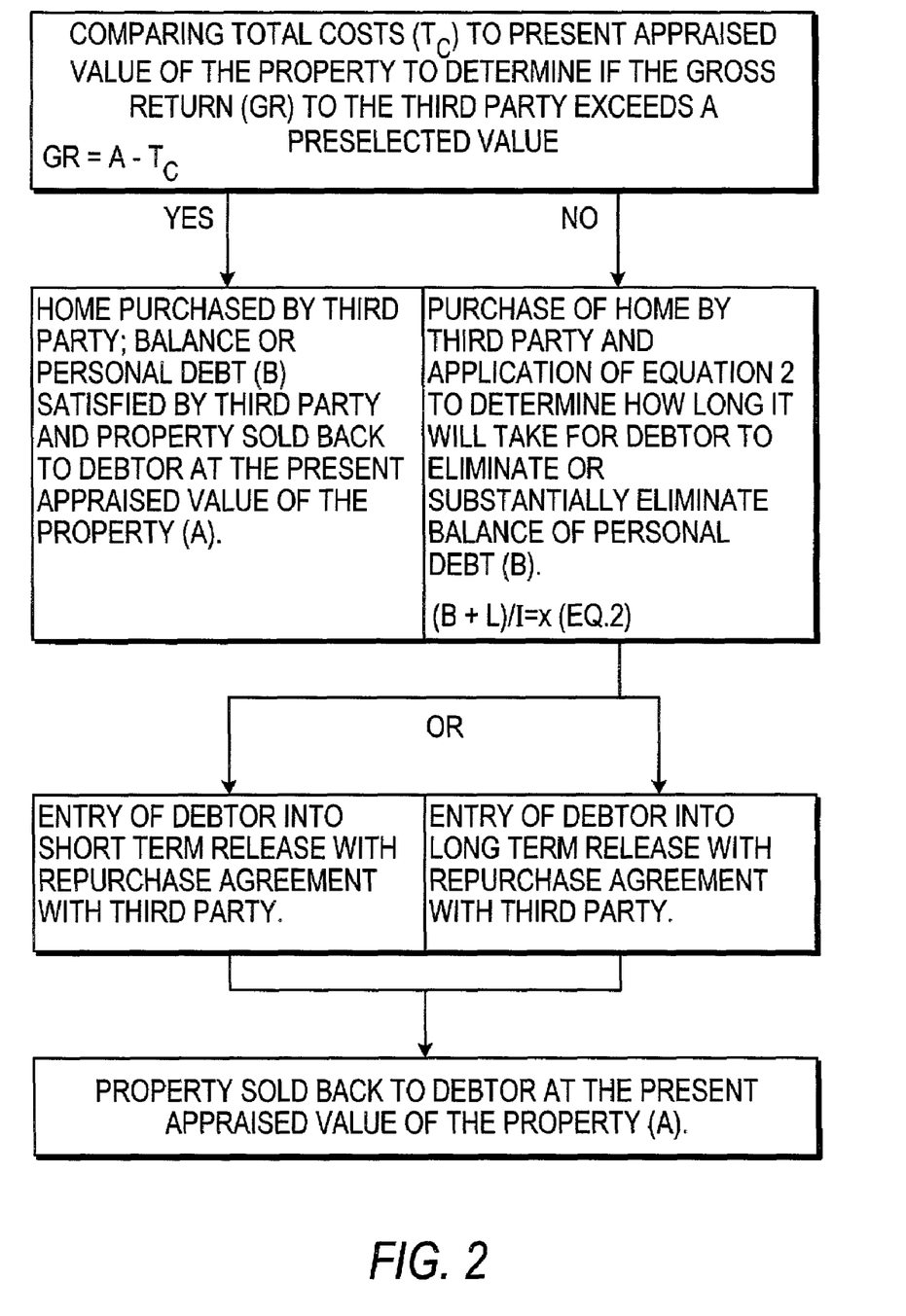

Each of the steps according to the method of present invention are outlined in FIGS. 1 and 2. Under actual circumstances once the homeowner experiences the financial crisis discussed above he would approach the third party through legal representation seeking assistance from the third party corporation. The third party then, according to the invention, (1) itemizes and totals all of the debtor's personal debt, i.e. calculates the debtor's balance of personal debt "B"; (2) determines the mortgage debt remaining on the residential property "M"; (3) determines the appraised value of the home "A"; (4) calculates the closing costs for purchasing the home based upon the remaining mortgage balance "$C_1$"; (5) calculates the closing costs for reselling the real property back to the debtor based upon present value of the home "$C_2$"; (6) calculates a down payment for reselling the real property back to the debtor at the appraised value of the home "D"; (7) calculates the total costs "$T_C$" to the third party for purchasing the home from the debtor, satisfying the debtor's personal debt and reselling the home back to the debtor at the present appraised value of the home according to the formula $T_C=(B+M+C_1+C_2+D)$; (8) compares the total costs $T_C$ to the present appraised value of the home "A" and if the appraised value of the home exceeds the total costs $T_C$ by a "selected predetermined amount" than the real property is purchased by a third party; the debtor's existing debt is satisfied by said third party; and the real property is sold back to the debtor by said third party at a premium. All costs for the transaction including the closing cost $C_1$ for purchasing the property from the debtor, the down payment D for selling the home back to the debtor and the closing costs $C_2$ for selling the home back to the debtor are all covered by the third party corporation.

The "selected predetermined value" mentioned above is a minimum gross return necessary for the third party corporation to realize a profit and is determined by the third party corporation based upon factors relating to the cost of doing business. This "selected predetermined value" will vary depending upon variables such as the location of the third party cooperation, number of employees, overhead costs and so forth.

As shown in FIG. 2 if the appraised value of the home A fails to exceed the total costs $T_C$ by said selected predetermined amount then the third party applies a second equation, Equation 2, which calculates the time it will take for the debtor to eliminate his personal debt. Based upon Equation 2 if it is determined that it will take less than one year for the debtor to eliminate his personal debt than the third party enters into a "short-term release with repurchase agreement" with the homeowner. If it is determined that it will take more than one year for the debtor to eliminate his personal debt than the third party enters into a "long-term release with repurchase agreement" with the homeowner.

As discussed above, if according to Equation 2, it is determined that it will take less than one year for the debtor to eliminate his personal debt than the third party corporation enters into a "short-term release with repurchase agreement" with the debtor. According to the terms of the "short-term release with repurchase agreement" the third party corporation agrees to immediately purchase the distressed residential property from the debtor. In exchange the debtor agrees to let the third party corporation supervise and control the debtor's finances for up to one year. Typically, prior to the execution of the agreement, the two parties would meet and discuss the debtor's monthly expenses (e.g. car payment, insurance, credit card bills etc.) and according to the terms of the agreement arrange for these monthly debts to be paid by direct withdrawl from the debtor's checking account. Also in accordance with the agreement the debtor would reside at the residential property for six-months, or some other appropriate selected time period, rent free. During this initial time period the debtor would thus be able to lower his balance of personal debt B without the additional financial burden of paying rent. The agreement would further specify that after this initial six-month period (or other selected period) the debtor would pay the third party cooperation rent at an agreed upon rate for the remaining six months of the agreement.

Further in accordance with the terms of the "short-term release with repurchase agreement" the third party corporation would provide the debtor with an agreed upon monthly stipend for food, work and/or school transportation, said stipend obtained from the debtor's monthly earnings. By supervising and controlling the debtor's finances in this fashion the third party corporation assists the debtor in managing his finances and also insures that the debtor's balance of debt is reduced.

By the end of the term of the agreement the debtor's personal debts B are zero and the debtor has successfully been paying his bills for a one year period and has been paying rent for a six month period thereby restoring the debtor's credit rating. Moreover, by eliminating or at the very least substantially reducing the debtor's balance of debt B, Equation 1 discussed above is now viable. Therefore, also in accordance with the terms of the agreement, the third party cooperation agrees to sell the residential property back to the debtor at the end of the one year term at a premium in the manner discussed above.

As discussed above, if according to Equation 2, it is determined that it will take more than one year for the debtor to eliminate his personal debt than the third party corporation enters into a "long-term release with repurchase agreement" with the debtor. Generally, according to the terms of this agreement, the third-party corporation agrees to immediately purchase the distress residential property from the debtor. In exchange the debtor agrees to pay the third party corporation a rental rate to reside at the property. Unlike the "short-term release with repurchase agreement" discussed above there is no initial rent free period according to the terms of the "long-term release with repurchase agreement". Rather debtor immediately begins to pay rent to the third-party cooperation upon execution of the agreement. The term of "long-term release with repurchase agreement" may be for any selected period of time but not to exceed ten years, i.e. for however long it takes for the debtor to eliminate or substantially eliminate his debt. However, like the "short-term release with repurchase agreement" discussed above at the end of the term of the agreement the debtor's balance of personal debt has been eliminated or substantially eliminated thereby rendering Equation 1 viable. Thus, also in accordance with the terms of the agreement, the third party cooperation agrees to sell the residential property back to the debtor at the end of term of the agreement term at a premium in the manner discussed above.

As discussed above, one of the terms of both the "short-term release with repurchase" and "long-term release with repurchase" agreements is that the debtor must make monthly payments towards reducing his personal debt. In the event the debtor is unable to meet these obligations, for example the debtor losses his job, and as a result breaches the contract both contracts provide for a selected contingency compensation amount to be paid to the debtor.

For example, in the case of a "short-term release with repurchase agreement" the terms of the contract might specify that in the event that a debtor involuntarily loses his job during the term of the agreement the debtor may have a selected time period (e.g. sixty days) in which to secure a job at equal or higher pay. In the event the debtor secures such a position the debtor may continue to reside in the property and pay rent to the third party cooperation according to the terms of the agreement. However, in the event that the debtor can only secure a position of lower pay or cannot secure a position whatsoever than the debtor will be granted a selected contingency compensation amount. This amount will be specified by the terms of the agreement however a suitable amount would be ¼ of the 10% down payment value based upon the present value of the property. For example if the present value of the property is $190,000 than the contingency compensation amount granted to the debtor would be $4,750.

Upon receipt of the selected contingency compensation all other provisions of the agreement would be voided and ownership and right to occupy the property would revert back to the third party cooperation. The selected contingency compensation amount insures that even if the debtor is unable to retain a job, and thereby unable to meet the financial obligations of either the "short-term release with repurchase" and "long-term release with repurchase", he is compensated to some extent to assist the debtor in obtaining a future residence.

Examples are provided below which outline the various aspects of the method according to the present invention and illustrate the operation of the present invention under different factual circumstances.

$$T_C = B + M + C_1 + C_2 + D \qquad \text{(EQ. 1)}$$
$$= 15{,}000 + 90{,}000 + 5{,}400 + 12{,}000 + 20{,}000 = \$142{,}400$$
$$GR = A - T_C = 200{,}000 - 142{,}400 = \$57{,}600$$

In Example 1 provided above the appraised value of the home A exceeds the total costs $T_C$ to the third party by $57,600, therefore the gross return OR to the third party corporation is $57,600. Typically the "preselected predetermined amount" or the minimum gross return in order for the third party corporation to achieve a profit would be approximately $20,000. Therefore in the factual scenario set forth in Example 1 above the third party corporation would immediately purchase the distressed property from the debtor by satisfying the outstanding mortgage debt M, satisfy the debtor's outstanding personal debts B, and sell the property back to the debtor at the present value of the property A (i.e. $200,000). In addition the third party would provide all necessary closing costs to purchase the home from the debtor (i.e. $C_1$) and sell the home back to the debtor ($C_2$). In addition the third party corporation would provide the debtor with the necessary down payment D to purchase the property back from the third party corporation. By taking these steps, the third party corporation would achieve a gross return of $57,600.

$$T_C = B + M + C_1 + C_2 + D \quad \text{(EQ. 1)}$$
$$= 45,000 + 90,000 + 5,400 + 11,400 + 19,000 = \$170,800$$
$$GR = A - T_C = 190,000 - 170,800 = \$19,200$$

$$T_C = B + M + C_1 + C_2 + D \quad \text{(EQ. 1)}$$
$$= 0 + 90,000 + 5,400 + 11,400 + 19,000 = \$125,800$$
$$GR = A - T_C = 190,000 - 125,800 = \$64,200$$

In Example 2 provided above the appraised value of the home A exceeds the total costs $T_C$ to the third party by $19,200. Typically the "preselected predetermined amount" or the minimum gross return in order for the third party corporation to achieve a profit would be approximately $20,000. Therefore the third party corporation could not achieve a profit in Example 2 by immediately purchasing the property and reselling the property back to the debtor in the manner described with reference to Example 1. Rather the debtor's balance of personal debt must first be substantially reduced or eliminated in order to make Equation 1 viable.

To evaluate how long it will take for the debtor to eliminate his debt the third party corporation applies Equation 2 (Eq. 2). In Equation 2, x represents the time it will take for Mary and Joe to reach solvency in years, B represents Mary and Joe's balance of personal debt, I represents Mary and Joe's total yearly income, and L represents the yearly liabilities that Mary and Joe can anticipate for a family of four in any given year. The value L includes costs for everyday necessities including food, water, heat, transportation, etc. The value L used in the Example provided above is obtained from the U.S. Department of Health and Human Services Guidelines for Poverty Levels published by the U.S. Department of Health and Human Services. Specifically the value L used in Example 2 (i.e. $17,650) is the value assigned in the 2001 Guidelines for Poverty Levels for a family of four living in one of the 48 contiguous states or the District of Columbia living at the poverty level. Depending on the factual circumstances (e.g. if it is not a family of four) the value L will vary. Nonetheless the suitable value L can be found in said Guidelines for Poverty Levels.

The value L provides an estimate of the total costs for a family of four which is utilized in Equation 2. The value L may be modified, e.g. increased, as long as the value L used in Equation 2 reflects an estimated yearly debt to be incurred by the debtor in the upcoming year. The values provided in the U.S. Department of Health and Human Services Guidelines for Poverty Levels merely provide a guideline for the value L.

By applying Equation 2, that is by adding the balance of debt B to the estimated yearly liabilities L and then dividing this sum by the yearly income I, it is revealed that it will take Joe and Mary approximately 11 months to substantially or completely eliminate their debt. Since this value of x is less then one year, the third party corporation would enter into the "short-term release with repurchase agreement" with the debtor. Specifically, the third party corporation would immediately purchase the distressed property from the debtor and at the same time the debtor would enter into said "short-term release with repurchase agreement" with the corporation. As discussed above, according to the terms of the agreement the debtor would then reside at the property for a selected period (e.g. six-months) rent free during which time the debtor could reduce the balance of debt B without the burden of rent. After the initial rent free period the debtor would then begin paying the third party corporation rent for the remainder of the term of the agreement (e.g. six-months). At the end of the term of the agreement the third party would then sell the property back to the debtor. As shown Example 2, by applying Equation 1, after the term of the "short-term release with repurchase agreement" the third party's gross return GR is $64,200 now making equation 1 and thus the overall transaction viable. It is appreciated that the third party's actual return will not be equal to the GR since the third party corporation will incur additional operating costs during the term of the "short-term release with repurchase agreement". Nevertheless any such additional costs should be offset by the increase in the gross return GR.

$$T_C = B + M + C_1 + C_2 + D \quad \text{(EQ. 1)}$$
$$= 65,000 + 90,000 + 5,400 + 12,000 + 20,000 = \$192,400$$
$$GR = A - T_C = 200,000 - 192,400 = \$7,600$$

$$T_C = B + M + C_1 + C_2 + D \quad \text{(EQ. 1)}$$
$$= 0 + 90,000 + 5,400 + 12,000 + 20,000 = \$127,400$$
$$GR = A - T_C = 200,000 - 127,400 = \$72,600$$

In Example 3 provided above the appraised value of the home A exceeds the total costs $T_C$ to the third party by $7,600. Typically the "preselected predetermined amount" or the minimum gross return in order for the third party corporation to achieve a profit would be approximately $20,000. Therefore the third party corporation could not achieve a profit in Example 3 by immediately purchasing the property and reselling the property back to the debtor in the manner described with reference to Example 1. Rather the debtor's balance of personal debt must first be substantially reduced or eliminated in order to make Equation 1 viable.

To evaluate how long it will take for the debtor to eliminate his debt the third party corporation applies Equation 2 (Eq. 2) in the manner described in detail with reference to Example 2 above. Equation 2 reveals that it will take Mary and Joe approximately 14 months to substantially reduce or eliminate their balance of debt.

Since the value x in Example 3 is greater than one year the third party corporation would enter into a "long-term release with repurchase" agreement with the debtor. According to the terms of said agreement, as discussed above, the third party corporation would immediately purchase the distressed property from the debtor. The debtor would continue to reside at the property and immediately begin to pay the third party corporation rent at a rate determined by the third party corporation. In addition the debtor would immediately begin to make payments to reduce the debtor's balance of debt. At the end of the term of the agreement (i.e. approximately 14 months later) the third party corporation would then sell the property back to the debtor. By applying Equation 1 after the term of the "long-term release with repurchase" agreement reveals that the third party corporation's gross return GR is $72,600. Again it is appreciated that the third party's actual return will not be equal to the GR since the third party corporation will incur additional operating costs during the term of the "long-term release with repurchase agreement". Nevertheless any such additional costs should be offset by the increase in the gross return GR.

Figure 3A:
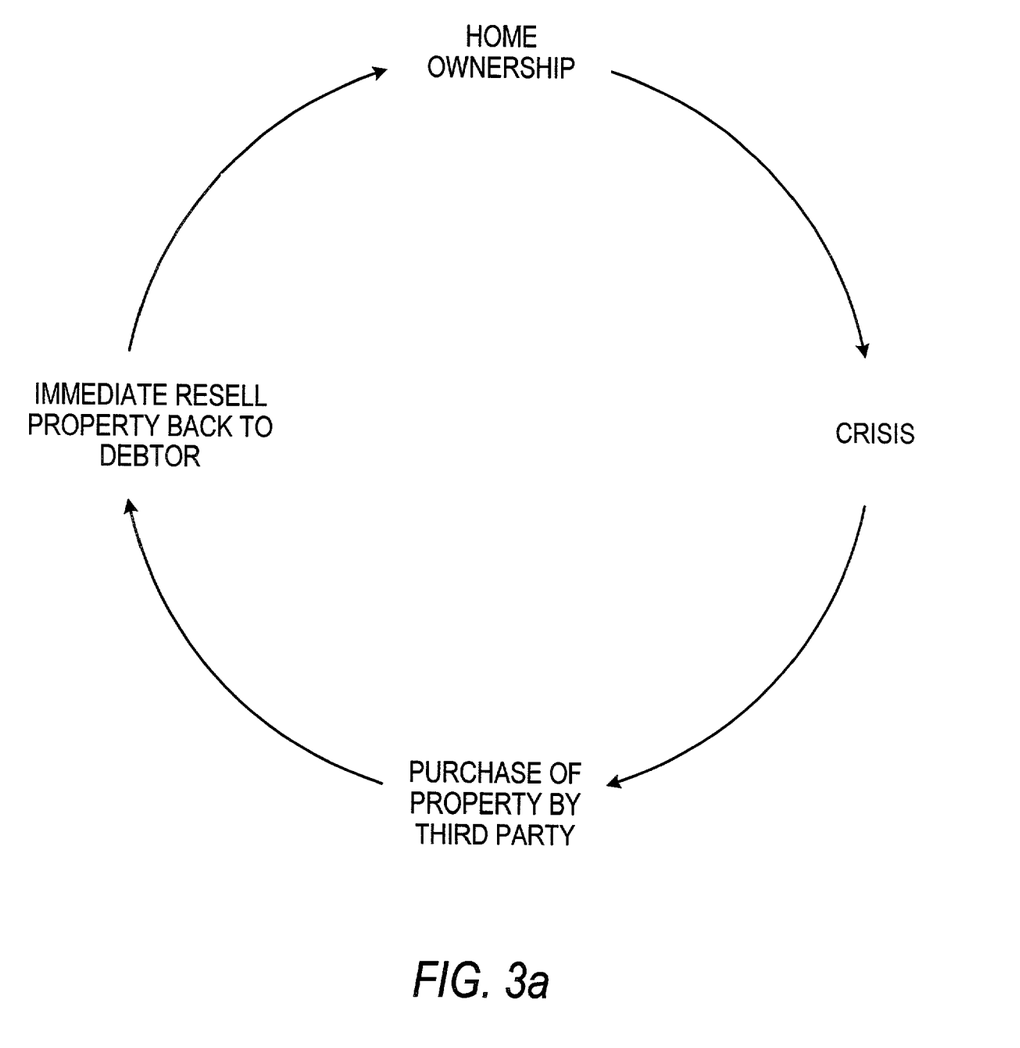
FIGS. 3a–3c show diagrams illustrating the life cycles of the method according to the present invention under different factual circumstances.
Figure 3B:
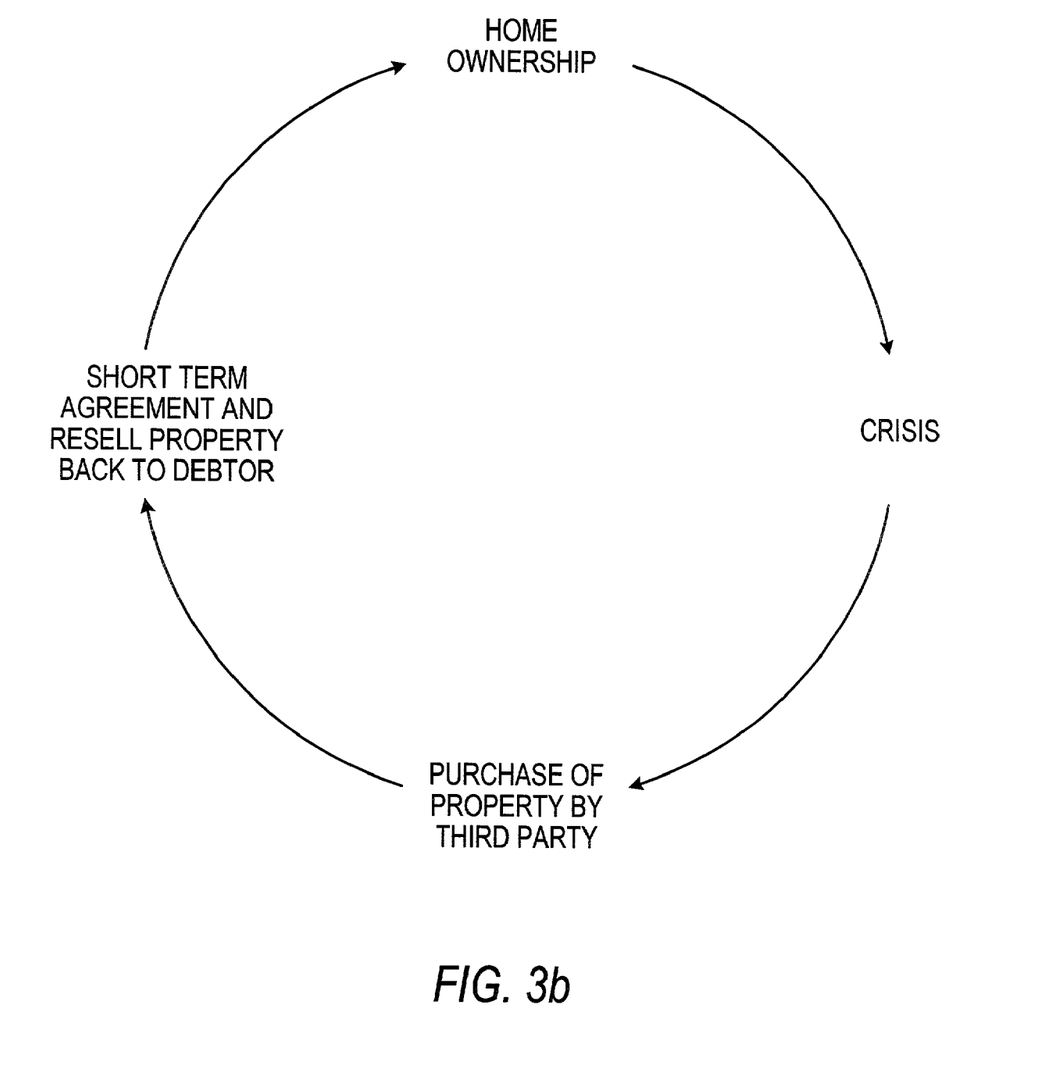
Figure 3C:
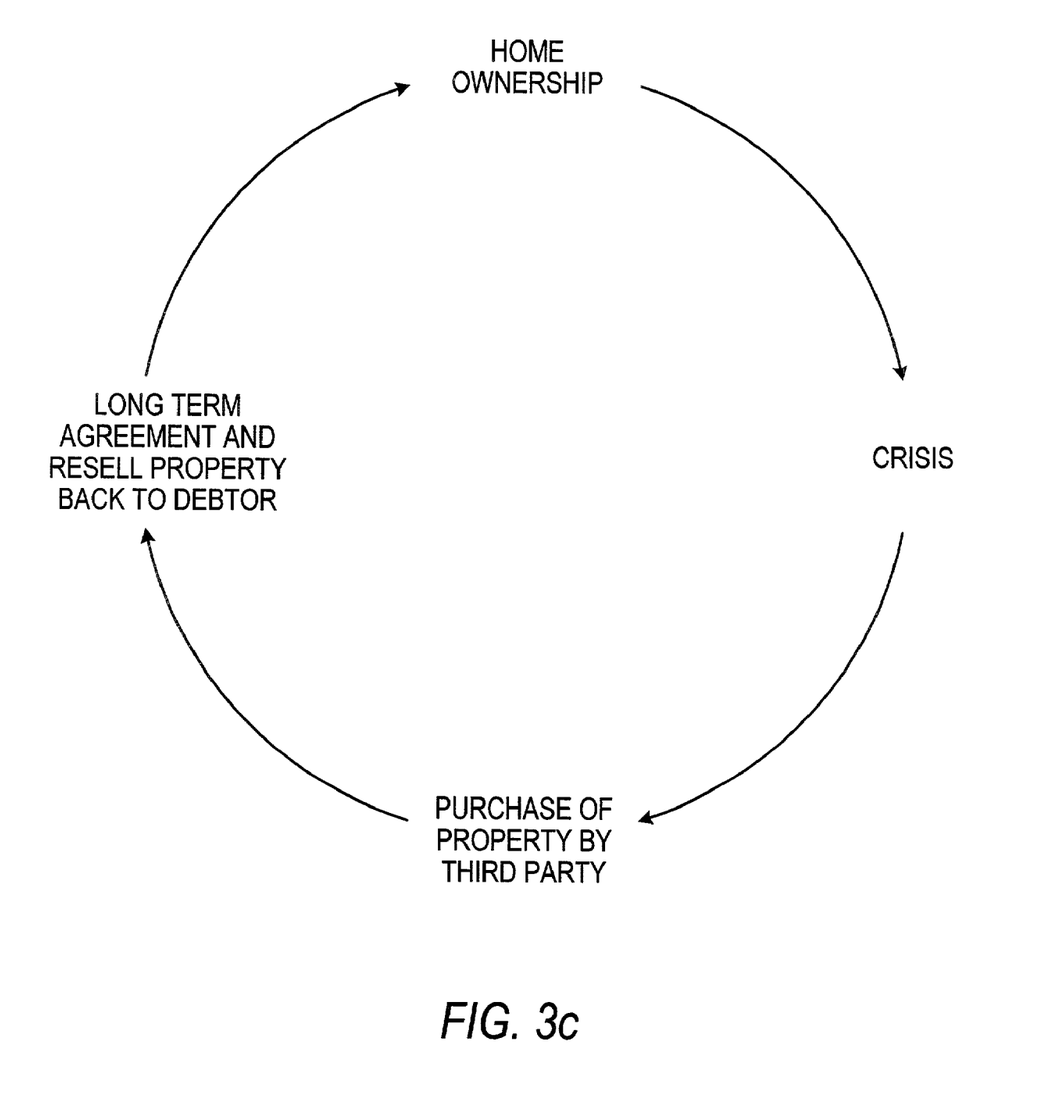

Reference is now made to FIG. 3. As discussed above with reference to Examples 1–3 the goal of the method according to present is to ultimately sell the distressed property back to the debtor. However, as shown by the examples, the factual circumstances of each situation will control what steps must be taken prior to the property being sold back to the debtor. FIGS. 3a–3c visually depict the life cycle of the method according to the present invention in factual scenarios discussed with regard to Examples 1–3 above. FIG. 3a corresponds to Example 1 discussed above. As shown in FIG. 3a the life cycle begins with home ownership. Thereafter a crisis occurs which diminishes the home owner's ability to meet his financial obligations. Than the third party corporation intervenes to assist the home owner. In FIG. 3a, as discussed in Example 1, the present appraised value of the home A exceeds the total costs $T_C$ to such an extent that it is viable for the third party to immediately purchase and resell the home to the debtor. FIG. 3b, illustrates the scenario discussed above in Example 2. In this case the debtor enters into a "short-term release with repurchase agreement" with the third party corporation. Nevertheless at the end of the term of the agreement the property is resold to the debtor. Finally, FIG. 3a, illustrates the scenario discussed above in Example 3. In this case the debtor enters into a "long-term release with repurchase agreement". Again, at the end of the term of the agreement the property is resold to the debtor.

A situation may arise where the debtor does not wish to retain ownership in the distressed property but rather merely wishes to dispose of the distressed property and have his existing debt eliminated. In such a situation Equation 1 may be utilized to determine if the present value of the home A exceeds the total costs $T_C$ for purchasing the property from said debtor and reselling the property to another party at the present value of the home by said "preselected predetermined amount". If Equation 1 is satisfied the third party corporation may purchase the distressed property and resell the property to another party. Alternatively the third party corporation may purchase the distressed property and rent the property to another party. In either case, if equation 1 is satisfied, the debtor disposes of the distressed property and has his existing debt eliminated.

It is understood that the foregoing description of the invention and examples provided above are exemplary and explanatory and are not intended to limit the scope of the present invention.

We claim:

1. A method for restructuring the debt of a debtor who has an interest in a distressed property comprising the steps of:

calculating a balance of the debtor's personal debt (B);

determining a mortgage balance remaining on the property (M);

determining the property's present appraised value (A);

calculating a first closing cost ($C_1$) for purchasing the property from the debtor based upon the mortgage balance remaining on the property (M);

calculating a second closing cost ($C_2$) for reselling the property back to the debtor based upon the present appraised value of the property (A);

calculating a down payment (D) for reselling the property back to the debtor at the appraised value of the property (A);

determining a total cost ($T_C$) according to the equation $T_c=(B+M+C_1+C_2+D)$ for purchasing the property from the debtor, satisfying the debtor's personal debt and reselling the property back to the debtor at a present appraised value of the property;

comparing the total cost ($T_C$) to the present appraised value in the property (A) to determine if the present appraised value of the home (A) exceeds the total cost ($T_C$) by a preselected amount; and purchasing said property from said debtor, satisfying said debtor's balance of personal debt (B), and reselling said property back to said debtor at the present appraised value of the home (A) if said appraised value of the property (A) exceeds said total cost ($T_C$) by said preselected amount.

2. The method according to claim 1, further comprising, providing funds for the costs of said first closing ($C_1$), second closing cost ($C_2$), down payment (D) and satisfaction of balance remaining on the property (M).

3. The method according to claim 1, further comprising:

if said appraised value of the property (A) does not exceed said total cost ($T_C$) by said preselected amount determining a time period (x), wherein time period (x) is the time it will take said debtor to eliminate said balance of said personal debt (B) and, if said time period (x) is one year or less leasing said property to said debtor for an initial time period rent free and leasing said property to said debtor for a second time period after said initial time period at a selected rental rate.

4. The method according to claim 3, wherein said time period is calculated according to the equation x=(B+L)/I, wherein x is the time period, B is the balance of personal debt, L is an estimated yearly liability, and I is a yearly income.

5. The method according to claim 3, further comprising: controlling said debtor's finances for a selected period to ensure a reduction in said debtor's balance of personal debt (B).

6. The method according to claim 3, further comprising: reselling said property back to said debtor after said balance of personal debt (B) has been eliminated.

7. The method according to claim 6, further comprising: providing funds for the costs of said first closing cost ($C_1$), second closing cost ($C_2$), down payment (D) and satisfaction of balance remaining on the property (M).

8. The method according to claim 3, further comprising: if said time period (x) is more than one year leasing said property to said debtor at a selected rental rate.

* * * * *